United States Patent
Barboiu et al.

(10) Patent No.: US 12,397,266 B2
(45) Date of Patent: Aug. 26, 2025

(54) COMPOSITE BIOMIMETIC MEMBRANES WITH ARTIFICIAL WATER CHANNELS

(71) Applicants: Centre National de la Recherche Scientifique, Paris (FR); Université de Montpellier, Montpellier (FR); École Nationale Supérieure de Chimie de Montpellier, Montpellier (FR); Politecnico di Torino, Turin (IT)

(72) Inventors: Mihail-Dumitru Barboiu, Montpellier (FR); Maria Di Vincenzo, Montpellier (FR); Alberto Tiraferri, Turin (IT)

(73) Assignees: Centre National de la Recherche Scientfique, Paris (FR); Ecole Nationale Supérieure de Chimie de Montpellier, Montpellier (FR); Université de Montpellier, Montpellier (FR); Politecnico di Torino, Turin (IT)

(*) Notice: Subject to any disclaimer, the term of this patent is extended or adjusted under 35 U.S.C. 154(b) by 510 days.

(21) Appl. No.: 17/642,625

(22) PCT Filed: Sep. 9, 2020

(86) PCT No.: PCT/EP2020/075162
§ 371 (c)(1),
(2) Date: Mar. 11, 2022

(87) PCT Pub. No.: WO2021/048182
PCT Pub. Date: Mar. 18, 2021

(65) Prior Publication Data
US 2022/0347633 A1    Nov. 3, 2022

(30) Foreign Application Priority Data
Sep. 13, 2019   (FR) .................................. 1910152

(51) Int. Cl.
*B01D 69/12* (2006.01)
*B01D 71/56* (2006.01)
*C08L 77/06* (2006.01)

(52) U.S. Cl.
CPC ......... *B01D 69/1251* (2022.08); *B01D 71/56* (2013.01); *C08L 77/06* (2013.01)

(58) Field of Classification Search
CPC ...... B01D 69/1251; B01D 71/56; C08L 77/06
See application file for complete search history.

(56) References Cited

U.S. PATENT DOCUMENTS

| | | | |
|---|---|---|---|
| 4,277,344 | A | 7/1981 | Cadotte |
| 2012/0043274 | A1 | 2/2012 | Chi et al. |
| 2014/0319047 | A1 | 10/2014 | Cheng et al. |

FOREIGN PATENT DOCUMENTS

| | | |
|---|---|---|
| CN | 102512982 A | 6/2012 |
| CN | 105148750 A | 12/2015 |

(Continued)

OTHER PUBLICATIONS

Barboiu (Supramolecular artificial water channels: from molecular design to membrane materials, May 6, 2018, En Chimie Et Physicochimie Des Materiaux, Ecole doctorale ED459 Unite de recherche UMR5635) (Year: 2018).*

(Continued)

*Primary Examiner* — Youngsul Jeong
(74) *Attorney, Agent, or Firm* — Conley Rose, P.C.

(57) ABSTRACT

The invention relates to the field of biomimetic membranes with artificial water channels, notably the use thereof in the context of the production and management of drinking water. The present invention relates to a biomimetic membrane with artificial water channels, the method of synthesis (Continued)

thereof, as well as the use thereof for desalination of brackish water and seawater, production of ultra-pure water or filtration of contaminants.

12 Claims, 6 Drawing Sheets

(56) References Cited

FOREIGN PATENT DOCUMENTS

| JP | 2016-505374 A | 2/2016 |
|---|---|---|
| JP | 2019507673 A | 3/2019 |
| WO | 2013043118 A1 | 3/2013 |
| WO | 2021048182 A1 | 3/2021 |

OTHER PUBLICATIONS

Khorshidi et al. (A Novel Approach Toward Fabrication of High Performance Thin Film Composite Polyamide Membranes, 2016, Scientific Reports | 6:22069 | DOI: 10.1038/srep22069). (Year: 2016).*
Foreign Communication from a Related Counterpart Application, Singapore Search Report dated Jan. 18, 2023, Singapore Application No. 11202201413W filed on Sep. 9, 2020.
Di Vincenzo, M. et al., "Polyol-functionalized thin-film composite membranes with improved transport properties and boron removal in reverse osmosis" Journal of Membrane Science, Jun. 16, 2017, vol. 540, pp. 71-77.
Karimi, H. et al., "Polyamide membrane surface and bulk modification using humid environment as a new heat curing medium" Journal of Membrane Science, Apr. 23, 2016, vol. 523, pp. 129-137.
Hélix-Nielsen, C., "Biomimetic Membranes as a Technology Platform: Challenges and Opportunities" Membrane, Jul. 17, 2018, vol. 8, No. 44, pp. 1-16.
Kocsis, I., "Supramolecular artificial water channels: from molecular design to membrane materials" Thèse Pour Obtenir Le Grade De Docteur De L'université De Montpellier, Oct. 5, 2017, https://hal.umontpellier.fr/tel-01684404/document.
Foreign Communication from a Related Counterpart Application, Written Opinion dated Nov. 17, 2020, International Application No. PCT/EP2020/075162 filed on Sep. 9, 2020.
Foreign Communication from a Related Counterpart Application, French Search Report dated May 18, 2020, French Application No. 1910152 filed on Sep. 13, 2019.
Foreign Communication from a Related Counterpart Application, International Search Report dated Nov. 17, 2020, International Application No. PCT/EP2020/075162 filed on Sep. 9, 2020.
Istvan Kocsis. "These Pour Obtenir Le Grade De Docteur De L'Universite De Montpellier En Chimie Et Physicochimie Des Ma Teriaux" May 6, 2018 (May 6, 2018). Retrieved from the Internet: https://hal.umontpellier.fr/tel-01684404/document [retrieved on May 6, 2020] XP055692327.
Alfredo Gonzalez-Perez et al. "Functional Channel Membranes for Drinking Water Production" Water, vol. 10, No. 7, Jun. 28, 2018 (Jun. 28, 2018), p. 859 DOI: 10 .3390 /w10070859 XP055692339.
Eliasson, "The rising pressure of global water shortages" J Nature 2015, Jan. 1, 2015, vol. 517, 6-7.
Schewe, J. et al., "Multimodel assessment of water scarcity under climate change" Proc. Natl. Acad. Sci. 2014, vol. 111, pp. 3245-3250.
Imbrogno, J. et al. "Membrane Desalination: Where Are We, and What Can We Learn from Fundamentals?" Annual Review of Chemical and Biomolecular Engineering 2016, Feb. 2, 2016, 7, pp. 1-36, doi: 10.1146/annurev-chembioeng-061114-123202.
Philip, W.A. et al., "The Future of Seawater Desalination: Energy, Technology, and the Environment" Science, 2011, vol. 333, pp. 712-717, DOI: 10.1126/science.1200488.
Park, H.B. et al., "Maximizing the right stuff: The trade-off between membrane permeability and selectivity" Science, 2017, 356, Jun. 16, 2017, DOI: 10.1126/science.aab0530.
Pendergast M.T.M. et al., "A review of water treatment membrane nanotechnologies" Energy and Environmental Science, 2011, 4, pp. 1946-1971, DOI: 10.1039/c0ee00541j.
Agre, P. "Aquaporin Water Channels (Nobel Lecture)" Membrane Proteins, Angew. Chem. Int. Ed. 2004, 43, pp. 4278-4290, DOI: 10.1002/anie.200460804.
Tang, C.Y. et al., "Desalination by biomimetic aquaporin membranes: Review of status and prospects" Desalination 2013, 308, pp. 34-40, doi: 10.1016/j.desal.2012.07.007.
Kumar, M., et al., "Highly permeable polymeric membranes based on the incorporation of the functional water channel protein Aquaporin Z" Proc. Natl. Acad. Sci. 2007, vol. 104, pp. 20719-20724, Dec. 26, 2007.
Zhao, Y. et al., "Synthesis of robust and high-performance aquaporin-based biomimetic membranes by interfacial polymerization-membrane preparation and RO performance characterization" Journal of Membrane Science, 2012, 423-424, 422-428.
Qi, S. et al., "Aquaporin-based biomimetic reverse osmosis membranes: Stability and long term performance" Journal of Membrane Science 2016, 508, pp. 94-103.
Y. Le Duc, et al., "Imidazole-Quartet Water and Proton Dipolar Channels" Angew. Chem. Int. Ed. 2011, 50(48), pp. 11366-11372, DOI: 10.1002/anie.201103312.
E. Licsandru, et al., "Salt-Excluding Artificial Water Channels Exhibiting Enhanced Dipolar Water and Proton Translocation" Journal of the American Chemical Society, 2016, 138, Apr. 10, 2016, pp. 5403-5409, DOI: 10.1021/jacs.6b01811.
M. Barboiu, "Artificial water channels—incipient innovative developments" The Royal Society of Chemistry, Chem. Commun., 2016, 52, pp. 5657-5665, DOI: 10.1039/c6cc01724j.
I. Kocsis, et al. "Oriented chiral water wires in artificial transmembrane channels" Physics, Science Advances 2018, 4, Mar. 23, 2018, DOI: 10.1126/sciadv.aao5603.
La, et al. "Enhanced desalination performance of polyamide bi-layer membranes prepared by sequential interfacial polymerization" Journal of Membrane Science, 2013, 437, pp. 33-39.
Chuwdhury et al. "3D printed polyamide membranes for desalination" Membranes, Science, 2018, 361, Aug. 17, 2018, pp. 682-686, DOI: 10.1126/science.aar2122.
Foreign Communication from a Related Counterpart Application, Japanese Office Action dated Jul. 2, 2024, Japanese Application No. 17/642,625 filed on Mar. 11, 2022.

* cited by examiner

Figure 7D

COMPOSITE BIOMIMETIC MEMBRANES WITH ARTIFICIAL WATER CHANNELS

CROSS-REFERENCE TO RELATED APPLICATIONS

The present application is a filing under 35 U.S.C. 371 as the National Stage of International Application No. PCT/EP2020/075162, filed Sep. 9, 2020, entitled "COMPOSITE BIOMIMETIC MEMBRANES WITH ARTIFICIAL WATER CHANNELS," which claims priority to French Application No. 1910152 filed with the Intellectual Property Office of France on Sep. 13, 2019, both of which are incorporated herein by reference in their entirety for all purposes.

The invention relates to the field of biomimetic membranes with artificial water channels, notably the use thereof in the context of the production and management of drinking water.

The present invention relates to a biomimetic membrane with artificial water channels, the method of synthesis thereof, as well as the use thereof for desalination of brackish water and seawater, production of ultra-pure water or filtration of contaminants.

Water shortages and the problems associated with lack of drinking water are well known (Eliasson, J *Nature* 2015, 517, 6-7). Treated as a lack of an essential resource, it is becoming more and more urgent in the context of simultaneous increase of population and of economic activity. Maintaining a balance of supply and demand should have a notable impact on climate change owing to the emissions generated by industry. To cope with the increasing demand for water supply, several cutting-edge technologies have been explored in recent decades. As far as water is concerned, the most abundant source by far is still the oceans, which represent 97.5% of the total amount of water on Earth (Schewe, J. et al. *Proc. Natl. Acad. Sci.* 2014, 111, 3245-3250). Today, about 100 million m$^3$/day of desalinated water is produced, with an annual increase of more than 10%.

Current technologies are based on thermal methods (multi-effect desalination-MED and multi-stage Flash-MSF) and on membrane methods (reverse osmosis under pressure, RO, electrodialysis-ED, membrane distillation-MD and direct osmosis-FO), the method RO being dominant for the desalination of seawater or brackish water (Imbrogno, J. et al. *Annu. Rev. Chem. Biomol. Eng.* 2016, 7, 1-36). Energy consumption has gone down, but even with a maximum thermodynamic efficiency of about 60%, the costs of desalination are considerably higher than the costs of using surface water or groundwater.

Desalination is still to this day a method that is too expensive.

The minimum energy required to operate at 60% recovery is about 1.2 kWh/m$^3$ and this value increases to above 1.5 kWh/m$^3$ at 80% recovery (Philip, W. A. et al. *Science,* 2011, 333, 712-717). Efficiency could be increased in the future either by a) modifying the conditions of the RO technique or b) improving the membranes. Closed-circuit reverse osmosis will soon allow operation in these conditions with high recovery, but probably with much higher effective energy requirements. Desalination by RO, which uses thin-film composite membranes, has evolved considerably over the years, reducing costs considerably. It has recently been emphasized that selectivity counts as much, if not more, than permeability (Park, H. B. et al. *Science,* 2017, 356, eaab0530). It is therefore crucial to innovate in the field of membranes. More than half a century has passed since the design of the first membrane in polyamide-PA thin-film composite TFC (Cadotte, J. E., 1981, U.S. Pat. No. 4,277,344 A.C).

New materials for increased productivity in desalination have been developed in recent years, leading to the emerging fields of research such as nanocomposites for example (Thin Film Composites—TFN) which include zeolite nanoparticles for example, and have improved permeability (2-3.5 LMH/bar) but still have reduced selectivities with a lower degree of NaCl rejection ~95-97% (Pendergast M. T. M. et al. *Energy Environ. Sci.,* 2011, 4, 1946-1971).

In all cases, an increase in permeability regularly causes a decrease in selectivity without the two performance figures being improved synergistically relative to those of the conventional RO membranes.

Numerous technologies are inspired by nature in our present company, and most of them relate to the macroscopic scale. As an example, the molecular characteristics of biological protein channels are very important for the future design of artificial systems allowing modulation of pore functionality (for example, pumping, displacement) under ionic gradients across the lipid membrane. Transport of water across the cell membrane takes place specifically along the aquaporins (AQPs), known for their high osmotic water permeability and their perfect rejection of ions (Agre, P. *Angew. Chem. Int. Ed.* 2004, 43, 4278-4290). These properties inspired the incorporation of AQPs in materials for the design of RO membranes, by adding membrane proteins intended for desalination.

However, large-scale applications of such systems still suffer from the high costs of production of the AQPs, low stability and constraints on manufacture, the operating conditions of the membrane and desalination (Tang, C. Y. et al. *Desalination* 2013, 308, 34-40).

A first attempt at comparing the permeability of an ABA polymer membrane incorporating AQPZ has been carried out. Relative to the productivities of the conventional RO membrane (1 µm/s/bar) and of the ABA polymer support membrane without AQP (2 µm/s/bar), the membrane of modified AQP-ABA showed a productivity of 167 µm/s/bar. In fact, an improvement in the permeability of the membranes by ~2 orders of magnitude did not lead to a decrease in energy consumption by the same factor (Kumar, M., et al. *Proc. Natl. Acad. Sci.* 2007, 104, 20719-20724). In a second step, with the aim of obtaining membranes in AQPs with high stability and increased performance, a different strategy was applied by using a mixed matrix approach with three main components: i) AQP proteins, ii) liposomes in which the AQPs are incorporated for purposes of protection and iii) a polyamide substrate enclosing the liposomes (Zhao, Y. et al. *J. Membrane Sci.* 2012, 423-424, 422-428). The choice of liposomes is justified by the fact that the AQPs are transmembrane proteins and their native environment is the hydrophobic region of the cell membranes. The hybrid polyamide membranes based on AQP on a flat substrate proved to be more permeable (4 LMH/bar, +33% relative to the reference polyamide membrane), with reduced selectivity: NaCl rejection 97% (Qi, S. et al. *J. Membrane Sci.* 2016, 508, 94-103).

However, these results are still insufficient for large-scale exploitation.

There is therefore a need to develop new composite biomimetic membranes that overcome the drawbacks identified in the prior art. In particular, there is a need for a membrane that allows costs to be reduced significantly, while having desalination performance better than that generally observed.

The applicant has been able to develop a new type of composite membranes with artificial water channels (AWCs). The membranes according to the invention offer improved performance in water transport and rejection of salts. The I-quartets (I4) incorporated in a lipid membrane according to the present invention are capable of transporting up to ~$1.5 \times 10^6$ water molecules/s/channel across the bilayer membrane, which although being lower than the AQPs ($10^8$ water molecules/s/channel), makes it possible to reject all the ions. These properties give the membranes according to the invention great selectivity by exclusion of ions and provide them with high selectivity.

At present, no biomimetic membrane, of whatever nature, meets the harsh requirements of the methods of desalination by RO. The membranes according to the invention provide transport of water at very high permeability while maintaining a high level of rejection of ions. The membrane is thus resistant to the conditions of use.

The present invention thus relates firstly to novel biomimetic membrane materials that overcome the various drawbacks of the prior art. Moreover, the method for preparing these new membrane materials is simple and inexpensive. They have improved performance relative to the existing RO membranes, in particular in terms of water permeability, rejection of salts and of organic molecules and in terms of mechanical and chemical stability. The present invention thus gives a simultaneous improvement of permeability and selectivity for water through superstructures of soft material with an increased preference for water owing to the artificial water channels. This is reflected in particular at the level of the synergistic increase in water permeability (4-5 LMH/bar) and selectivity/rejection of NaCl (<99.5%) and their long-term stability. The water permeability of the membranes according to the invention is 3 to 5 times better than that of the conventional RO membranes (1.3-1.5 LMH/bar) while ensuring a level of rejection of NaCl of more than 99%.

The invention thus relates to a composite biomimetic membrane, characterized in that it comprises:

an ultrafiltration supporting membrane, at least one compound of formula I:

Formula I in which

R represents a linear or branched C4 to C8 alkyl group, preferably selected from butyl, pentyl, hexyl, heptyl or octyl, X represents S or O, and a crosslinked polyamide film.

Advantageously, in the composite biomimetic membrane according to the invention, the at least one compound of formula I is in the form of supramolecular aggregates of the imidazole quartet type, distributed homogeneously in the rigid matrix formed by the crosslinked polyamide film.

Advantageously, the composite biomimetic membrane according to the invention is characterised in that it comprises:

an ultrafiltration supporting membrane, at least one compound of formula I:

Formula I in which

R represents a linear or branched C4 to C8 alkyl group, preferably selected from butyl, pentyl, hexyl, heptyl or octyl, X represents S or O, and a crosslinked polyamide film, and in that the at least one compound of formula I is in the form of supramolecular aggregates of the imidazole quartet type, distributed homogeneously in the rigid matrix formed by the crosslinked polyamide film.

In the present application, "ultrafiltration supporting membrane" means any type of microporous support compatible with the pressures and the uses envisaged. It may be for example a microporous support of microporous polysulphone (PSF) or of polyether sulphone (PES) cast on a support of non-woven reinforcing fabric of polyethylene (PET), polypropylene (PP), polyacrylonitrile (PAN 50 or PAN 450), or of PVDF (polyvinylidene). It may be selected for example from the commercial membranes of the type M-PS20-GPET and M-PS35-GPP. The molecular weight cutoff (MWCO) of the support may be from 10 to 250 kD, preferably from 10 to 40 kD, or more preferably from 20 to 35 kD, with an MWCO point value of 20 kD. The thickness of the support may be of the order of 20 to 200 µm, for example from 20 to 70 µm for a porous support of PSF or PES and from 50 to 150 µm for a support of PET or PP.

Advantageously, the composite biomimetic membrane according to the invention may be selected from the membranes in which the ultrafiltration supporting membrane has a molecular weight cutoff within a range from 10 to 250 kD, preferably from 10 to 40 kD, or even more preferably from 20 to 35 kD, with an MWCO point value of 20 kD. The thickness of the ultrafiltration supporting membrane may be from 20 µm to 200 µm, preferably from 20 µm to 150 µm.

Advantageously, the permeability to pure water (WP) of the microporous support may be considered in the range from 750 to 1600 LMH/bar with a point value of WP=750 LMH/bar for the manufacture of asymmetric membranes of seawater and brackish water and 1600 LMH/bar for the synthesis of PA membranes of brackish water and tap water.

Advantageously, the membrane according to the invention comprises at least one compound of formula I:

Formula I in which, represents a linear or branched C4 to C8 alkyl group, preferably selected from butyl, pentyl, hexyl, heptyl or octyl, X represents S or O.

Advantageously, the compound of formula I may be selected from the compounds in which R is a butyl or a hexyl.

Advantageously, the compound of formula I may be selected from the compounds in which X represents O.

Advantageously, the composite biomimetic membrane according to the invention may comprise at least one compound of formula II:

Formula II in which $R^1$ represents a butyl or hexyl.

Advantageously, in the composite biomimetic membrane according to the invention, the compounds of formula I or II are in the form of supramolecular aggregates of the imidazole quartet or I-quartet type as described in Le Duc et al., Licsandru et al. or Barboiu et al. (Y. Le Duc, et al., *Angew. Chem. Int. Ed.* 2011, 50 (48), 11366-11372; E. Licsandru, et al., *J. Am. Chem. Soc.*, 2016, 138, 5403-5409; M. Barboiu, *Chem. Commun.*, 2016, 52, 5657-5665 4. I. Kocsis et al. *Science Adv.* 2018, 4, eaao5603). Preferably, in the composite biomimetic membrane according to the invention, the compounds of formula I or II are in the form of supramolecular imidazole quartet or I-quartet aggregates. As defined in Le Duc et al, Licsandru et al or Barboiu et al, an imidazole quartet, or I-quartet, is a self-assembly of four molecules of formula I or II and two water molecules. The I-quartet defines the first degree of organisation of the artificial water channels and the assemblies of the channels lead to the formation of the supramolecular aggregates which are homogeneously embedded in the polyamide film during the implementation of the method of the present invention.

In the context of the present application, "supramolecular aggregate" means a crystalline aggregate that may have an average diameter from 20 to 40 nm. The supramolecular aggregates may be made up of self-organized lamellar phases containing artificial water channels of the imidazole-quartet type. The average size of the nonporous aggregates is generally from 20 to 40 nm. According to the distribution observed based on a spoke structure, each aggregate may comprise 84000 molecules, or 14 amol average in a crystal with dimensions of 30×30×30 nm with an ideal distribution of 70×50×24 molecules of formula I or II according to the three dimensions of the crystal.

Advantageously, in the membrane according to the invention, a supramolecular aggregate may comprise from 9 to 18 amol of compound of formula I or II.

Advantageously, the supramolecular aggregates of the imidazole quartet or I-quartet type are distributed homogeneously in the rigid matrix formed by the crosslinked polyamide film. The surface density of aggregates of the molecules of formula I or II may range from 30 to 40 aggregates/100 $\mu m^2$.

"Crosslinked polyamide film" means a surface film resulting from the in situ polymerization of a crosslinked polyamide. The polyamide is formed from monomers bearing amine functions ("amine monomer" hereinafter) and from monomers bearing acyl chloride functions ("acyl chloride monomer" hereinafter). The monomers may be divalent and trivalent. As the polyamide film is crosslinked, at least one of the monomers used is trivalent.

Advantageously, the amine monomers may be of the following formulas $H_2N-R^a-NH_2$ or $H_2N-R^a(NH_2)-NH_2$, $R^a$ being a C1 to C20 group, linear or branched, aliphatic or heteroaliphatic, saturated or unsaturated, cyclic or acyclic, aryl or heteroaryl, aralkyl or alkaryl, optionally comprising heteroatoms selected from O, N and/or S. For example, the amine monomer may be a diamine or triamine (divalent or trivalent). Preferably, the amine monomer may be selected from the group comprising metaphenylenediamine, orthophenylenediamine, paraphenylenediamine, piperazine, ethylenediamine, polyethyleneimine (for example of Mn=70000, 10000, 1800 or 600) and melamine.

Advantageously, the acyl chloride monomers may be of the following formulae $ClOC-R^b-COCl$ or $ClOC-R^b(COCl)-COCl$, $R^b$ being a C1 to C20 group, linear or branched, aliphatic or heteroaliphatic, saturated or unsaturated, cyclic or acyclic, aryl or heteroaryl, aralkyl or alkaryl, optionally comprising heteroatoms selected from O, N and/or S. For example, the acyl chloride monomer may be an di acyl chloride or tri acyl chloride (divalent or trivalent). Preferably, the acyl chloride monomer may be selected from the group comprising mesoyl trichloride, terephthaloyl chloride, isophthaloyl chloride and cyclohexane 1,3,5-tricarbonyl chloride.

Advantageously, at least one of the monomers is trivalent in order to obtain a crosslinked polyamide film. Preferably, the monomers used are metaphenylenediamine (MPD) and mesoyl trichloride (trimesoyl chloride, TMC).

Advantageously, the crosslinked polyamide film may be deposited or formed on the microporous surface of the ultrafiltration supporting membrane. The crosslinked polyamide film may have a thickness from 0.05 to 0.4 $\mu m$, preferably from 0.08 to 0.15 $\mu m$.

Advantageously, the composite biomimetic membranes according to the invention may be so-called high, low or very low density membranes. For example, a high-density membrane may be prepared with a 0.32 M solution of MPD and a 3.7 mM solution of TMC. For example, a low-density membrane may be prepared with a 0.19 M solution of MPD and a 3.7 mM solution of TMC. For example, a very low density membrane may be prepared with a 0.13 M or 0.17 M solution of MPD and a 2.5 mM solution of TMC.

The invention also relates to a method for manufacturing composite biomimetic membranes according to the invention comprising:
 a step of impregnation of an ultrafiltration supporting membrane with a colloidal suspension comprising at least one compound of formula I, preferably in the form of supramolecular aggregates and
 a step of formation of a crosslinked polyamide film by interfacial polymerization on the surface of the impregnated membrane.

Advantageously, the method for manufacturing composite biomimetic membranes according to the invention comprises the steps:
 a) impregnating the surface of an ultrafiltration supporting membrane with a colloidal suspension comprising at least one compound of formula I in the form of supramolecular aggregates:

Formula I in which,
R represents a C4 to C8 alkyl group, preferably selected from butyl, pentyl, hexyl, heptyl or octyl,
X represents S or O;
b) formation of a crosslinked polyamide film by interfacial polymerization on the surface of the impregnated membrane obtained in step a), and production of the composite biomimetic membrane.

Advantageously, the colloidal suspension in step a) may comprise at least one compound of formula II:

Formula II in which $R^1$ represents a butyl or hexyl.

Advantageously, the colloidal suspension in step a) comprises an organic solvent and/or water. Preferably, the organic solvent may be selected from methanol, ethanol, propanol, isopropanol and acetonitrile. The solvent may be a mixture of water and organic solvent, preferably of water, and of ethanol or methanol. The solvent/water volume ratio may be from 70/30 to 90/10 v/v, preferably 85/15.

Advantageously, the concentration of the compound of formula I or formula II in the colloidal suspension in step a) of the method according to the invention is within a range from 4 mM to 0.15 M, preferably from 21.9 mM to 0.12 M.

Advantageously, preparation of the colloidal suspension in step a) of the method according to the invention may comprise the substeps:
i) dissolving a compound of formula I or II in an organic solvent;
ii) adding water (deionized or Milli-Q) in the solution obtained in i) at a solvent/water volume ratio from 70/30 to 90/10 v/v, preferably 85/15;
iii) homogenizing under ultrasound, preferably for a time of less than 30 minutes, followed by a period of rest, preferably with a duration of 1 to 3 hours.

Advantageously, the concentration of compound of formula I or II in the solution in step i) of preparation of the colloidal suspension in step a) of the method according to the invention is within a range from 5.23 mM to 0.18 M, preferably from 21.9 mM to 0.12 M, and more preferably from 33 mM to 83.9 mM.

Advantageously, the impregnation in step a) of the method according to the invention may be carried out by pouring the liquid solution, spraying or electrospraying on the surface of the supporting membrane.

Advantageously, step a) may be followed by a period of rest, preferably with a duration of 30 seconds to 5 minutes, before carrying out step b) of the method according to the invention. This period makes it possible to ensure uniform dispersion of the supramolecular aggregates of the colloidal suspension in the pores of the surface of the ultrafiltration supporting membrane.

Advantageously, the interfacial polymerization in step b) of the method according to the invention may comprise the substeps:
i) impregnating the surface of the impregnated membrane obtained in step a) with a solution comprising a di- or triamine monomer; and
ii) impregnating the surface of the impregnated membrane obtained in step i) with a solution comprising an di or tri acyl chloride monomer;
iii) polymerizing the impregnated membrane obtained in step ii) by immersion in water, at a temperature greater than or equal to 50° C.

Advantageously, the ultrafiltration supporting membrane may be fixed on a base. Said base may be a base of stainless steel, aluminium, toughened glass or Teflon. This may make it possible to limit the polymerization reaction to the available surface of the ultrafiltration supporting membrane.

Advantageously, the amine monomer is dissolved in water (deionized or Milli-Q). The concentration of amine monomer in the solution in step i) of the interfacial polymerization in step b) of the method according to the invention may range from 5.8 mM to 0.32 M. Depending on the concentration of monomer, we may obtain a high-density membrane (H-I4RO) by using a 0.32 M solution of amine monomer (for example MPD), low-density (L-I4RO) with a 0.19 M solution of amine monomer (for example MPD) or very low density (XL-I4RO) with a 0.13 or 0.17 M solution of amine monomer (for example MPD).

Advantageously, the impregnation in step i) of the interfacial polymerization in step b) of the method according to the invention may take less than 240 seconds, preferably less than 120 seconds.

Advantageously, the impregnation in step i) of the interfacial polymerization in step b) of the method according to the invention may be carried out by pouring the aqueous solution, spraying or electrospraying on the surface of the ultrafiltration supporting membrane.

Advantageously, the impregnation in step i) of the interfacial polymerization in step b) of the method according to the invention is followed by drying of the ultrafiltration supporting membrane to remove any excess solution on the surface of the membrane or trace of residual compounds. Drying may be carried out with an air stream or using absorbent materials.

Advantageously, the acyl chloride monomer is dissolved in an organic solvent (for example hexane, Isopar G, trichlorotrifluoroethene, toluene). The concentration of acyl chloride monomer in the solution in step ii) of the interfacial polymerization in step b) of the method according to the invention may range from 1.4 mM to 11.3 M. Depending on the concentration of monomer, we may obtain a so-called high-density (H-I4RO) or low-density (L-I4RO) membrane using a 3.7 mM solution of acyl chloride monomer (for example TMC) and a so-called very low density membrane (XL-I4RO) using a 2.5 mM solution of acyl chloride monomer (for example TMC).

Advantageously, the impregnation in step ii) of the interfacial polymerization in step b) of the method according to the invention may be carried out by immersion, spraying or electrospraying on the surface of the ultrafiltration supporting membrane.

Advantageously, the impregnation in step ii) of the interfacial polymerization in step b) of the method according to the invention may take less than 120 seconds, preferably less than 60 seconds.

Advantageously, the temperature in step iii) of the interfacial polymerization in step b) of the method according to the invention is greater than or equal to 50° C., preferably a temperature from 50 to 95° C., and even more preferably 95° C.

Advantageously, the duration of the immersion in step iii) of the interfacial polymerization in step b) of the method according to the invention may be from 60 to 240 seconds, preferably 120 seconds.

Advantageously, the method according to the invention further comprises a step c) of rinsing the composite biomimetic membrane obtained in step b). The rinsing may be carried out in an aqueous solution of NaOCl (for example at 200 ppm) and/or in an aqueous solution of $Na_2S_2O_5$ (for example at 1000 ppm), followed by a second immersion in water (deionized or MilliQ), preferably in conditions similar to step iii) of polymerization in step b) of the method according to the invention.

Advantageously, the membranes according to the invention may for example be stored in deionized water or in a solution of sodium metabisulphite (1 g/L) at low temperature (about 4° C.) or else protected by a protective layer such as glycerin prior to any use for filtration.

According to another aspect, the invention also relates to the use of the composite biomimetic membranes according to the invention for desalination of brackish water or of seawater, for producing ultra-pure water and/or filtration of contaminants.

In the context of the present invention, "contaminants" or "contaminating agents" means any element that makes the water unsuitable for consumption notably for toxicological reasons, for example urea, residues of medicinal products (paracetamol, etc.), nitrosamines, boric acid, etc.

Advantageously, the desalination yield is greater than or equal to 99% (expressed in NaCl rejection, $R_{NaCl}$), preferably greater than 99.5% or even up to 99.9%. For example, in the case of drinking water (for example with ΔP=6 bar, permeability P=4-5 LMH/bar), we get $R_{NaCl}$=99-99.5%), in the case of brackish water (for example with 3000 ppm NaCl, ΔP=15-18 bar and with permeability P=4-5.8 LMH/bar), we get $R_{NaCl}$=99-99.8%, or for seawater (for example with 35000 ppm NaCl, ΔP=65 bar and with permeability P=1.8-2.8 LMH/bar), we get $R_{NaCl}$=99.5-99.9%.

"NaCl rejection" means the percentage of the salt retained by the membrane, the value R=1−cp/cb, in which $c_p$=NaCl concentration of the permeate and $C_b$=NaCl concentration of the feed phase.

"Permeability to NaCl" means the permeability coefficient of solute B determined using the value of the actual rejection $R_r$ and the flow of permeate with a feed solution containing 35 g/L of NaCl at pH 8.

"Brackish water" means water with a concentration of 500-10000 ppm NaCl.

"Permeability" means coefficient A, corresponding to the flow of permeate with a feed solution of pure water, Jw,s0 divided by the pressure difference applied ΔP.

"Seawater" means water with a concentration of 30000-50000 ppm NaCl.

BRIEF DESCRIPTION OF THE FIGURES

FIGS. 2A-2C show photographs for scanning electron microscopy (SEM) showing the cross-section of the reference membranes without TFC channels and biomimetic membranes I4RO according to the invention; as well as the nanometric organization of the supramolecular aggregates of the I4s within the polyamide matrix.

FIGS. 7A-7D illustrate the differences in structure between membranes obtained from HC8 nano-crystalline solutions: FIG. 7a) at room temperature (25° C.) and FIG. 7b) at 60° C.; and membranes obtained from colloidal solutions of FIG. 7c) HC4, FIG. 7d) HC6 at room temperature according to the invention.

The invention is further illustrated by the following examples, in a non-limiting manner.

Example 1: Synthesis of Biomimetic Membranes I4RO According to the Invention

Materials and Method

The compound HC6 (compound of formula I in which X=O and R=hexyl) was synthesized according to the methods described in Le Duc and Licsandru (Y. Le Duc, et al., *Angew. Chem. Int. Ed.* 2011, 50 (48), 11366-11372; E. Licsandru, et al., *J. Am. Chem. Soc.,* 2016, 138, 5403-5409). Metaphenylenediamine MPD, trimesoyl chloride TMC, and hexane were purchased from ALDRICH. The commercial supporting membranes used are of type M-PS20-GPET (Nanostone Water, USA) and M-PS35-GPP (Solecta Membranes, USA).

Dissolution of a compound of HC6, from 31.6 to 65.1 mM depending on the product used (see Table 1 below) in 5 mL of ethanol.

Addition of 1 mL of deionized water (alcohol: water volume ratio 85/15 v/v) followed by homogenization with ultrasound for 15 min. The solution is then left to stand, without stirring, for a period of 1 to 3 hours before use. This solution contains aggregates of nanometric dimensions (of 300-400 nm) (I4).

The surface of an ultrafiltration supporting membrane of type M-PS20-GPET or M-PS35-GPP is then impregnated with the solution comprising the I4 aggregates. Said solution is maintained on the surface of the support, at room temperature, for about 1 min to 5 min, so as to increase evaporation of the solvent and ensure uniform dispersion of the product in the pores at the surface of said support.

Formation of the polyamide film PA is then carried out, for example according to a method of interfacial polymerization (Cadotte, J. E., 1981, U.S. Pat. No. 4,277,344 A.C). The amounts of each of the precursors used for preparing the TFN-AWC membranes given below are presented in Table 1 shown hereunder.

The ultrafiltration supporting membranes M-PS20-GPET and M-PS35-GPP are fixed with adhesive tape on a stainless steel base so that the polymerization reaction is only produced on the available surface.

The metaphenylenediamine MPD is dissolved in deionized water. The use of a solution of MPD of 0.32 M leads to formation of the high-density membranes (H-I4RO), the use of a solution of MPD of 0.19 M leads to formation of the low-density membranes (L-I4RO), whereas the use of a solution of MPD of 0.13 M and 0.17 M leads to formation of the very low density membranes (XL-I4RO). The surface of the ultrafiltration membrane M-PS20-GPET or M-PS35-GPP (Table 1) is impregnated by immersion for 120 seconds in the solution of MPD to obtain uniform and homogeneous dispersion.

The membrane is dried using an air blower to remove any excess solution on the surface of the membrane or trace of residual compounds.

Trimesoyl chloride TMC is dissolved in hexane (of 3.7 mM for the high-density membranes (H-I4RO) and low-density membranes (L-I4RO), at 2.5 mM for the very low density membranes (XL-I4RO)) by uniform dispersion on the surface of the ultrafiltration membrane M-PS20-GPET or M-PS35-GPP (Table 1), by immersion of the membrane in the solution for 60 seconds.

Interfacial polymerization takes place and the thin film of polyamide (of reference TFC without AWC or of biomimetic membrane I4RO) is formed.

Formation of the thin films PA-TFC or I4RO on the surface of the supporting membranes, with a thickness of about 0.1 to 0.4 µm, is observed.

The membranes obtained are then immersed in deionized water at 95° C. for about 120 seconds, followed by rinsing with an aqueous solution of 200 ppm NaOCl for about 120 seconds, followed by immersion in an aqueous solution of 1000 ppm $Na_2S_2O_5$ for about 30 seconds, finally being immersed in deionized water at 95° C. for about 120 seconds.

The membranes are stored in deionized water at 4° C. or protected with a protective layer of glycerin prior to any use for filtration.

TABLE 1

Biomimetic composite membranes, high (H-I4RO), low (L-I4RO) or very low (XL-I4RO) density

| Membrane I4RO | I4 | I4 conc. (mM) | MPD conc. (mol/L) | TMC conc. (mM) | support |
|---|---|---|---|---|---|
| H-I4RO_1 | HC6 | 31.6 | 0.32 | 3.7 | M-PS20-GPET |
| H-I4RO_2 | HC6 | 47.5 | 0.32 | 3.7 | |
| H-I4RO_3 | HC6 | 54.6 | 0.32 | 3.7 | |
| H-I4RO_4 | HC6 | 65.1 | 0.32 | 3.7 | |

TABLE 1-continued

Biomimetic composite membranes, high (H-I4RO), low (L-I4RO) or very low (XL-I4RO) density

| Membrane I4RO | I4 | I4 conc. (mM) | MPD conc. (mol/L) | TMC conc. (mM) | support |
|---|---|---|---|---|---|
| L-I4RO_1 | HC6 | 47.5 | 0.19 | 3.7 | |
| L-I4RO_2 | HC6 | 54.6 | 0.19 | 3.7 | |
| L-I4RO_3 | HC6 | 54.6 | 0.19 | 3.7 | M-PS35-GPP |
| L-I4RO_4 | HC6 | 57.7 | 0.19 | 3.7 | |
| XL-I4RO_1 | HC6 | 54.6 | 0.17 | 2.5 | |
| XL-I4RO_2 | HC6 | 54.6 | 0.13 | 2.5 | |

Figure 1:
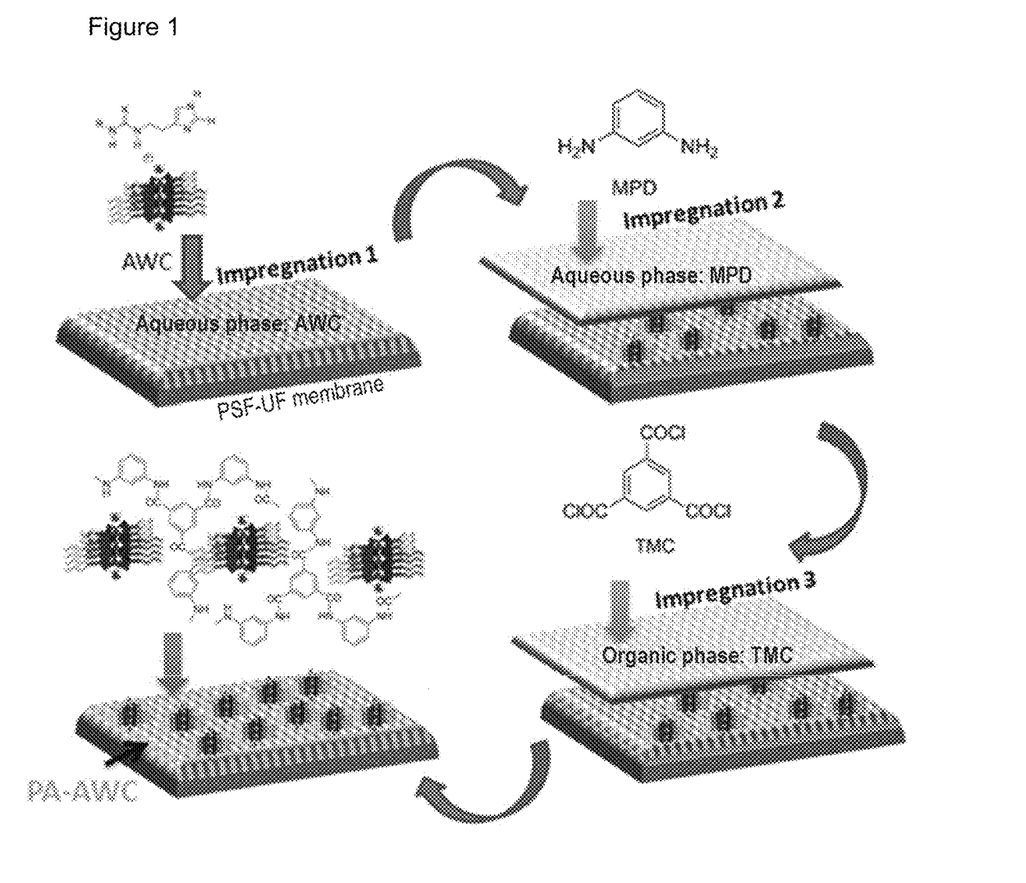
FIG. 1 shows a schematic procedure of the method according to the invention: preparation of a composite biomimetic membrane PA-AWC according to the invention (I4RO): impregnation of the ultrafiltration supporting membrane of PS20-GPET with an aqueous solution containing supramolecular aggregates (AWC) followed by impregnation with an aqueous solution comprising the amine monomer MPD, followed by impregnation with an organic solution containing the acid chloride monomer TMC followed by the reaction of interfacial polymerization (IP) resulting in the production of a polymer film of polyamide (PA) incorporating the water channels within the crosslinked biomimetic layer PA-AWC according to the invention.
Figure 2A:
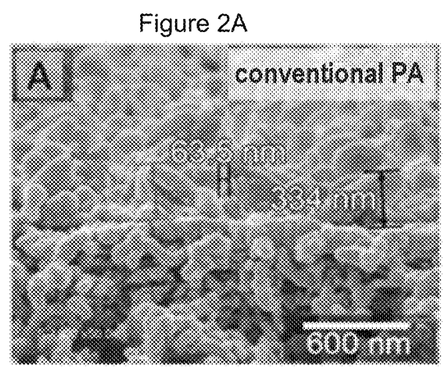
FIG. 2A) TFC reference membrane (magnification×240000), FIG. 2B) biomimetic membrane I4RO (magnification×240000) according to the invention and FIG. 2C) detail of the thin film of polyamide PA showing the homogeneous distribution of the supramolecular aggregates of I4 (AWC) (30-40 nm white spots) on the entire surface of the PA-AWC polymer (magnification×480000).
Figure 2B:
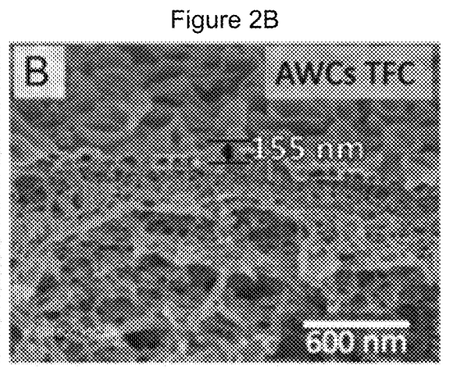
Figure 2C:
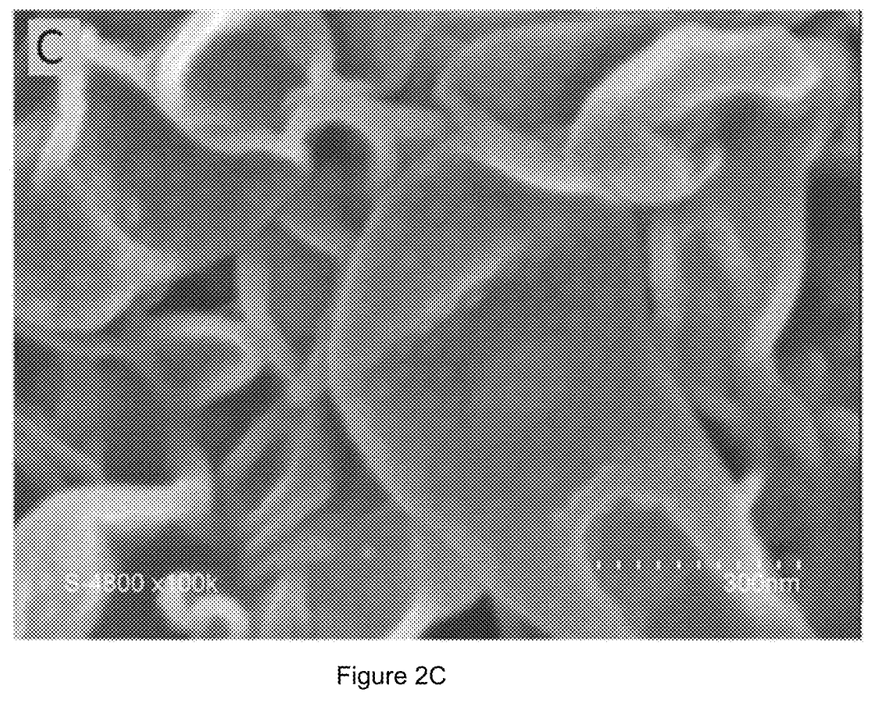

Example 2: Methods for Static Characterization and Characterization in Filtration Processes, of the Composite Biomimetic Membranes Analyses in transmission electron microscopy revealed a very high degree of organization at the nanometric level (see FIG. 2). In fact, these photographs show the formation of the thin films with a thickness of 300-350 nm for the reference membranes TFC in polyamide PA, which is greatly reduced to 70-150 nm for the biomimetic membranes I4RO. These structures have a morphology of the crests and valleys with a thickness of 30 nm for the reference membranes TFC in polyamide PA, which is greatly reduced to 15-20 nm for the biomimetic membranes I4RO. It is also remarkable to observe the distribution of the artificial water channels AWCs within the polymer matrix, for which the SEM images highlight the formation of the supramolecular clusters at a scale of 30-40 nm, forming regions of nanometric channels arranged parallel to one another and very uniformly within the polyamide matrix.

Figure 3:
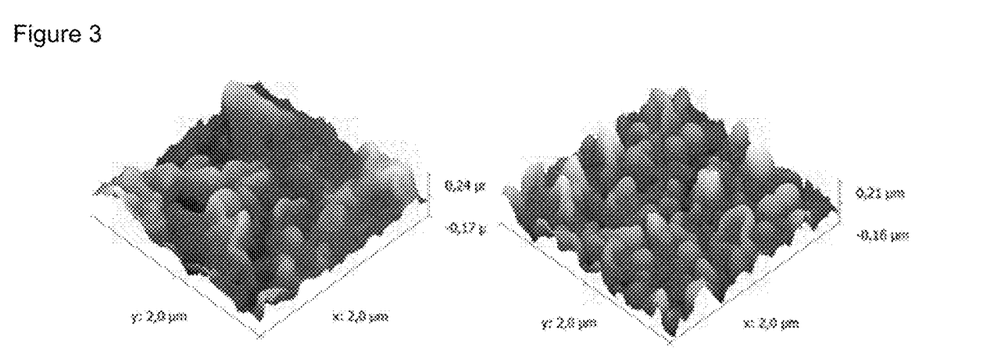
FIG. 3 shows images of atomic force microscopy AFM of A) the TFC reference membrane (left) and the biomimetic membranes B) H-I4RO_1 and C) L-I4RO_2.

Atomic force microscopy (AFM): Nanoman with electronic system Nanoscope 5 (Bruker Instruments) was used for measuring the surface roughness of the TFC and I4RO membranes. The sample was placed directly on the motorized XY stage, using the Tapping mode. The measuring tips for digitization of the samples were from Nanosensors, PPP NCSTR, with a nominal spring constant of 7 N/m and a typical radius less than 5 nm. All the images were acquired with a sampling resolution of at least 512 pts/512 lines using a scanning frequency of 5.5 Hz for 5 µm$^2$ (size of the image) and of 0.65 Hz for smaller sizes. These AFM photographs (see FIG. 3) show formation of the thin films with considerable roughness for the reference membranes TFC in PA, which is greatly reduced the I4RO hybrid biomimetic membranes.

Figure 4A:
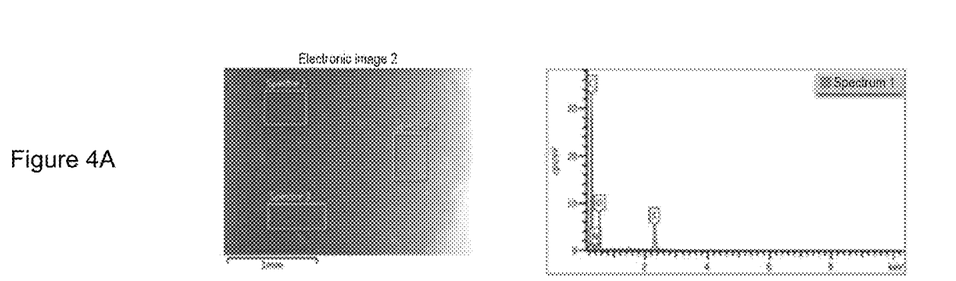
FIGS. 4A-4B show EDX surface analysis and the elementary surface distribution FIG. 4a) of the TFC reference membrane and FIG. 4b) the hybrid biomimetic membrane H-I4RO_1-HC6.
Figure 4B:
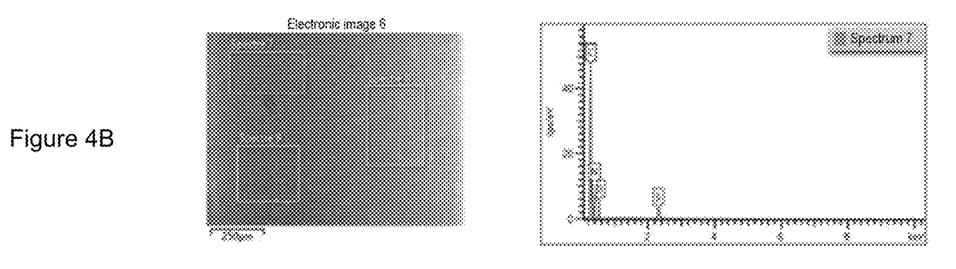

Energy-dispersive X-ray spectroscopy (EDX): Energy-dispersive X-ray spectroscopy (EDX) of active layers of polyamide was carried out with an AZTEC system, Oxford Instruments, UK. The samples were transferred onto a carbon strip of 0.5 cm$^2$ and an accelerating voltage of 10 kV at a working distance of 8.5 mm was used for EDX. At least three spectra were captured at different positions for calculating an average atomic percentage of C, N and O in the active layers of polyamide. After each scan, the EDX analysis software created a table containing the elemental composition of C, N and O. In fact, these analyses show (see FIG. 4 and Tables 2 and 3 below) enrichment of C % and N % for the I4RO biomimetic membranes in comparison with the PA-TFC reference membrane

TABLE 2

EDX surface analysis and the elementary surface distribution of the TFC reference membrane.

| Element | wt % | at % |
|---|---|---|
| C | 67.50 | 76.38 |
| N | 3.70 | 3.59 |
| O | 18.39 | 15.62 |
| S | 10.41 | 4.41 |
| Total | 100.00 | 100.00 |

TABLE 3

EDX surface analysis and the elementary surface distribution of the L-I4RO_4 biomimetic membrane.

| Element | wt % | at % |
|---|---|---|
| C | 76.00 | 82.51 |
| N | 3.90 | 3.63 |
| O | 13.92 | 11.35 |
| S | 6.17 | 2.51 |
| Total | 100.00 | 100.00 |

Figure 5:
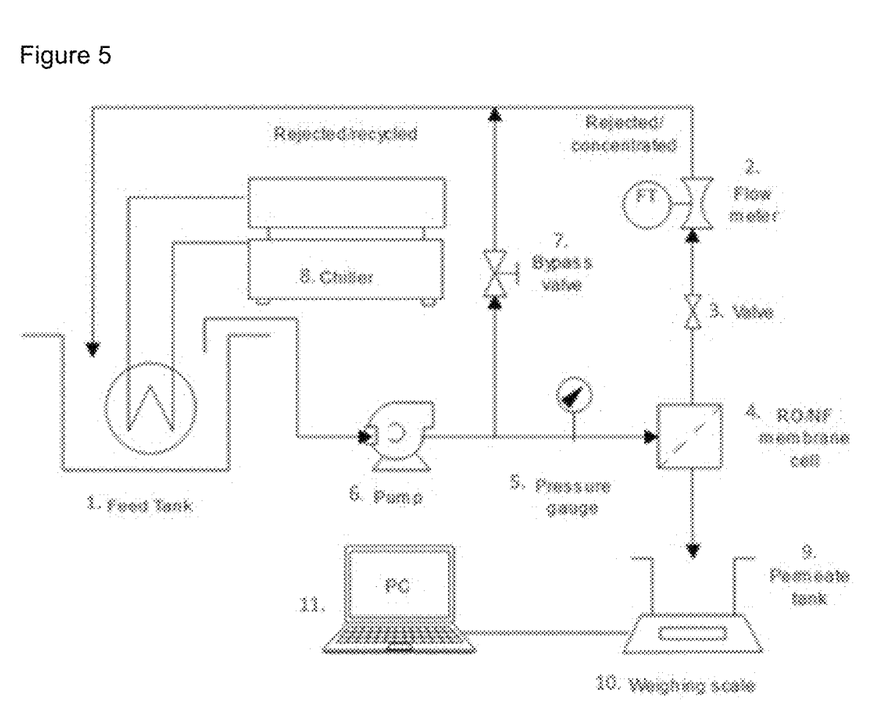
FIG. 5 shows the laboratory system used for measuring permeability to water, flow and solute rejection.

Filtration system: Measurements of the coefficient of permeability to pure water (also called permeability to water), flow of permeate and solute rejection, as well as experiments of countercurrent washing, were carried out using a cross-flow laboratory system for all the membranes, including the TFC reference membrane and the I4RO hybrid biomimetic membranes with different natures: I4RO_1, as well as the commercial reverse osmosis membranes (FIG. 5). The laboratory system comprises a high-pressure pump (Hydra-cell pump, Wanner Engineering, Inc., Minneapolis, MN), a feed tank, a flat-membrane receiving cell, systems for temperature control and data acquisition. The receiving cell consists of a rectangular channel with a length of 7.6 cm, width of 2.8 cm and height of 0.3 cm. The active surface area of the membrane sample is therefore 23 cm². The transverse flow rate was controlled by a floating-disk rotameter and adjusted, with the operating pressure, by means of a by-pass valve and a back pressure regulator (Swagelok, Solon, OH), whereas the flow rate of permeate was measured automatically for 60 s using a balance with a computer interface. The temperature was controlled by a recirculating cooler (model MC 1200, Lauda, Lauda-Königshofen) with a stainless steel coil immersed in the feed tank.

Measurements of permeability to water (A), flow and solute rejection: Before each experiment, the membrane was immersed in water overnight. After loading the membrane sample in the cell, the sample was compacted for 6 hours at an applied pressure of 20 bar (290 psi) or 70 bar (1015 psi) until stabilization to a state of equilibrium of the membrane. The applied pressure was then lowered to a value of 18 bar (261 psi) or 65 bar (943 psi) and the flow of pure water, $J_{w,0}$, was calculated by dividing the volumetric level of permeate obtained in the state of equilibrium by the surface area of the membrane. The membrane's coefficient of permeability to pure water, "A", was calculated from the value of $J_{w,0}$, as indicated in Table 4.

TABLE 4

Formulae used for calculating membrane performance

| Intrinsic permeability to water | $A = J_{w,0}/\Delta P$ | [LMH/bar] |
|---|---|---|
| Solute permeability coefficient | $B = J_w((1 - R)/R)\exp(-J_w/k)$ | [LMH] |
| Rejection | $R = 1 - c_p/c_b$ | [—] |
| Flow of permeate with a feed solution of | $J_w, 0$ | [LMH] |
| Flow of permeate with a feed solution containing 35 g/L of NaCl at pH 8 | $J_w$ | [LMH] |
| Pressure difference applied | $\Delta\Pi$ | [Bar] |
| Mass transfer coefficient in cross flow operating mode | k | [m/s] |
| Concentration of the permeate | $c_p$ | [mg/L] |
| Concentration of the feed phase | $c_b$ | [mg/L] |

Solute rejection tests were then carried out with a constant cross flow of 4.5 L/min (transverse flow velocity of 0.89 m/s), and an applied pressure of 65 bar (943 psi). The feed stream consisted of an aqueous solution of NaCl 100 mM (3000 ppm) for filtration at 18 bar (Table 5) or 600 mM (35000 ppm) for filtration at 65 bar (Table 6). The pH (8.0±0.1) is adjusted with sodium bicarbonate. The total volume of the feed solution at the start of the rejection test was of 5 L. The total duration of each rejection experiment was about 8 hours. After reaching the state of equilibrium, the flow of permeate, Jw, was calculated by dividing the volumetric level of permeate by the surface area of the membrane. The observed value of solute rejection was therefore calculated from the concentrations of solute in the feed stream and permeate stream, as indicated in Table 4. The concentrations of solute in the feed and permeate streams were found from the electrical conductivity measured using a calibration line. Three different observed rejection values were obtained, one every 30 minutes, and the three values were averaged. The permeability coefficient of solute "B" was also calculated as indicated in Table 4. For all the experiments, the temperature of the feed water was kept constant at 27±1° C.

Mechanical resistance to countercurrent washing: The membrane sample was first compacted for 12 h at an applied pressure of 70 bar (1015 psi) using pure water as feed solution. This step was followed by tests of permeability to water, flow rate and rejection carried out in the same operating conditions and at the same concentrations as described in the preceding section. Consequently, the values of A, B and the rejections observed were calculated for each membrane. Cycles of countercurrent washing were then carried out by inducing reverse flow of the solution of permeate from the support to the feed side of the membrane. After depressurization of the feed solution, the permeate flow pressure was increased to a value of 116 psi (6 bar), thus inducing reverse flow of permeate, for 20 min. The feed solution was allowed to flow with a transverse flow of 4.5 L/min during the countercurrent washing. After 20 minutes, the permeate solution was depressurized, and the feed solution was repressurized: tests of permeability to water, flow and rejection carried out in the same operating conditions and at the same concentrations as described previously, followed by determination of the values of A, B and observed rejections. Three cycles of countercurrent washing were carried out.

Chemical stability: In order to test the chemical stability of the membranes, they were stored for 30 minutes in different solutions containing: (i) sodium dodecyl sulphate 34 mM (at pH 11.5) or (ii) ethanol. After this step, the membranes were carefully rinsed with deionized water and tested as described above.

Figure 6A:
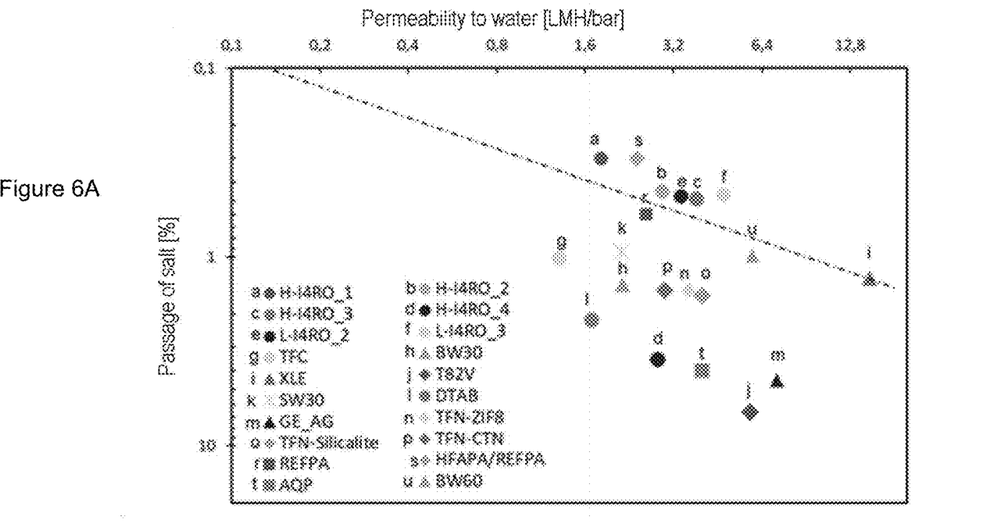
FIGS. 6A-6B show the performance in desalination FIG. 6a) of brackish water (18 bar) or FIG. 6b) of seawater (65 bar) using
the membranes according to the invention: a) H-I4RO_1, b) H-I4RO_2, c) H-I4RO_3, d) H-I4RO_4, e) L-I4RO_2, f) L-I4RO_3,
the reference membranes: g) TFC, l) DTAB (in AWC),
the commercial membranes: h) BW30, i) XLE, j) T82V, k) SW30, k1) SW30HR, k2) SW30XLE, m) GE_AG, u) BW60
the nanocomposite membranes: n) TFN-ZIF8, o) TFN-silicalite, p) TFN-CTN (Duan et al. J. Membrane Sci., 2018, 361, 682-686)
the functionalized polyamide membranes: r) REFPA, s) HFAPA, (La et al. *J. Membrane Sci.* 2013, 437 33-39, t) AQP, (Wang et al. *J. Membrane Sci.* 2012, 423-424, 422-428), v1) 3DPAN450TFC_1, v2) 3DPAN450TFC_2, v3) 3DPAN450TFC_3, v4) 3DPAN450TFC_4 (Chuwdhury et al. *Science,* 2018, 361, 682-686).
Figure 6B:
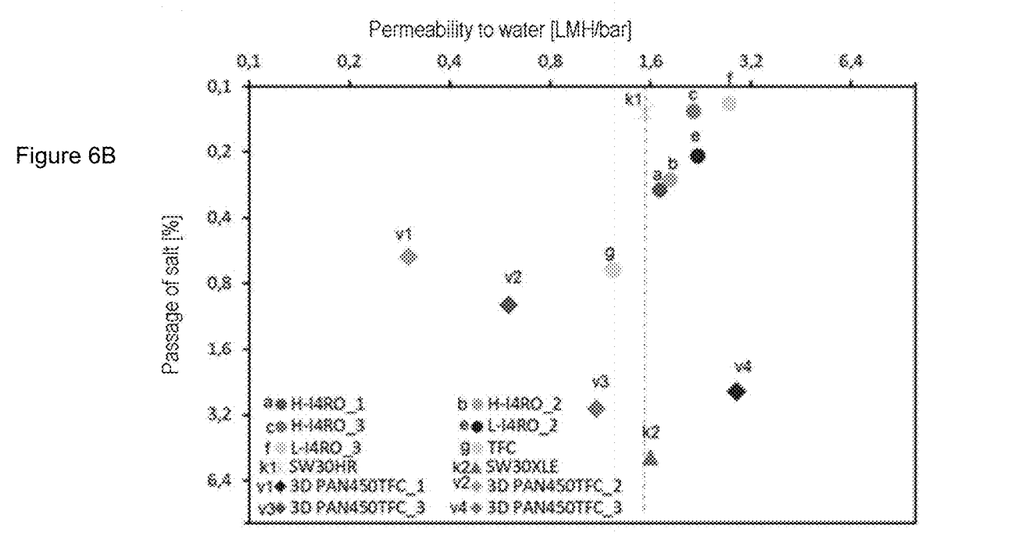
Figure 7A:
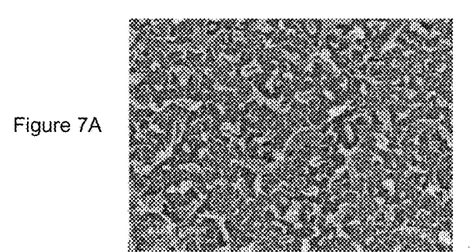
Figure 7B:
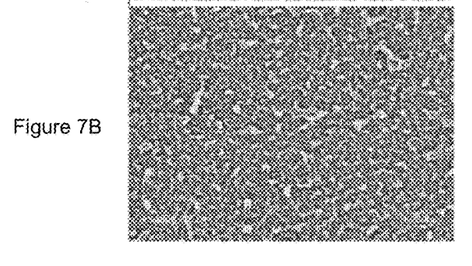
Figure 7C:
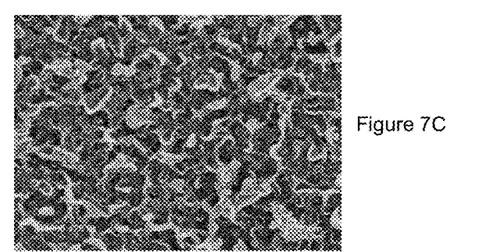
Figure 7D:
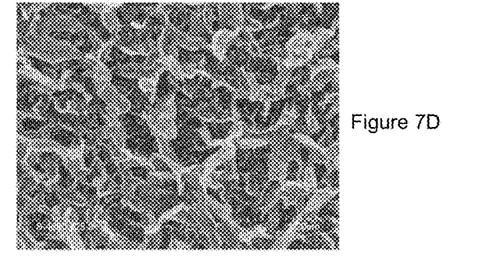

The results obtained for the saline solutions are shown in Tables 5 to 8 and in FIG. 6. Filtration results for organic contaminants such as paracetamol or urea are also shown.

TABLE 5

LPRO I4RO MEMBRANES (NaCl 3000 ppm, ΔP = 18 bar)

| Membrane | Average (AVG) and standard deviation (STD) | NaCl rejection observed (%) | Flow of deionized water (LMH) | Permeability to water, A (LMH/bar) | Flow, NaCl solution 100 mM (mL/min) | Permeability to NaCl B (LMH) | Actual rejection (Rr, %) |
|---|---|---|---|---|---|---|---|
| H-I4RO_1 | AVG | 99.62 | 32.76 | 1.82 | 1.31 | 0.07 | 99.74 |
|  | STD | ±0.18 | ±2.55 | ±0.14 | ±0.01 | ±0.03 | ±0.12 |
| H-I4RO_2 | AVG | 99.31 | 51.52 | 2.86 | 2.04 | 0.15 | 99.63 |
|  | STD | ±0.24 | ±8.25 | ±0.46 | ±0.38 | ±0.06 | ±0.14 |
| H-I4RO_3 | AVG | 98.92 | 69.35 | 3.85 | 2.61 | 0.26 | 99.51 |
|  | STD | ±0.28 | ±6.8 | ±0.38 | ±0.17 | ±0.07 | ±0.14 |
| H-I4RO_4 | AVG | 95.17 | 50.31 | 2.8 | 1.93 | 1.11 | 97.16 |
|  | STD | ±1.97 | ±4.64 | ±0.26 | ±0.16 | ±0.44 | ±1.28 |
| L-I4RO_2 | AVG | 99.07 | 61.45 | 3.41 | 2.16 | 0.21 | 99.52 |
| H-I4RO_3 | AVG | 99.1 | 85.54 | 1.65 | 2.8 | 0.22 | 99.62 |
| TFC | AVG | 98.62 | 24.4 | 0.36 | 1.04 | 0.22 | 98.98 |
|  | STD | ±0.07 | ±2.89 | ±0.16 | ±0.02 | ±0.01 | ±0.06 |
| SW30HR | AVG | 98.52 | 38.14 | 2.12 | 1.51 | 0.3 | 99.06 |
| BW60 | AVG | 97.17 | 107.34 | 5.96 | 3.47 | 0.71 | 99.01 |
| T82V | AVG | 96.9 | 29.68 | 1.65 | 1.24 | 0.56 | 97.82 |

TABLE 6

SWRO AWC MEMBRANES (NaCl 35000 ppm, ΔP = 65 bar)

| Membrane | Average (AVG) and standard deviation (STD) | NaCl rejection observed (%) | Flow of deionized water (LMH) | Permeability to water, A (LMH/bar) | Flow, NaCl solution 600 mM (mL/min) | Permeability to NaCl B (LMH) | Actual rejection (Rr, %) |
|---|---|---|---|---|---|---|---|
| H-I4RO_1 | AVG | 99.67 | 111.94 | 1.72 | 1.49 | 0.07 | 99.82 |
| H-I4RO_2 | AVG | 99.32 | 119.36 | 1.84 | 2.26 | 0.17 | 99.73 |
|  | STD | ±0.24 | 8.49 | 0.46 | 0.27 | 0.06 | 0.12 |
| H-I4RO_3 | AVG | 99.62 | 140.23 | 2.16 | 2.61 | 0.09 | 99.87 |
|  | STD | ±0.03 | 21.43 | 0.33 | 0.17 | 0.01 | 0.02 |
| TFC | AVG | 99.25 | 80.36 | 1.24 | 1.66 | 0.18 | 99.64 |
|  | STD | ±0.54 | 17.99 | 0.28 | 0.25 | 0.25 | 0.25 |
| SW30HR | AVG | 99.72 | 103.59 | 1.59 | 1.85 | 0.07 | 99.87 |
|  | STD | ±0.02 | 11.78 | 0.18 | 0.23 | 0.01 | 0.02 |
| L-I4RO_2 | AVG | 99.49 | 144.92 | 2.23 | 2.09 | 0.13 | 99.79 |
| L-I4RO_3 | AVG | 99.53 | 185.1 | 2.84 | 3.16 | 0.11 | 99.88 |

TABLE 7

LPRO(2) I4RO MEMBRANES (NaCl 2000 ppm, ΔP = 15.5 bar)

| Membrane | Average (AVG) and standard deviation (STD) | NaCl rejection observed (%) | Permeability to water, A (LMH/bar) | FLOW (LMH) | Permeability to NaCl B (LMH) | Actual rejection (Rr, %) |
|---|---|---|---|---|---|---|
| XL-I4RO_2 | AVG | 99.1 | 5.73 | 78.64 | 0.634 | 99.2 |
|  | STD | 0.26 | 0.17 | 5.33 | 0.107 | 0.29 |

TABLE 8

XLPRO I4RO MEMBRANES (TAP WATER, ΔP = 6 bar)

| Membrane | Average (AVG) and standard deviation (STD) | Observed rejection of salts, determined by measurements of conductivity | FLOW (LMH) | Rejection of Ca2+ determined by ion-exchange chromatography (%) |
|---|---|---|---|---|
| L-I4RO_3 | AVG | 98.96 | 25.5 | 98.96 |
|  | STD | 0.03 | 2.12 | 0.39 |
| L-I4RO_4 | AVG | 99.38 | 29 | 98.68 |
| XL-I4RO_1 | AVG | 99.39 | 29.1 | 99.46 |
| XL-I4RO_2 | AVG | 98.38 | 30.68 | 98.88 |
|  | STD | 0.5 | 1.81 | 0.27 |
| TW30 | AVG | 95.57 | 30.09 | 96.68 |

Example 3: Comparison of the Efficiency of a Biomimetic Membrane Comprising I-Quartet (According to the Invention) and a Membrane Comprising Nano-Crystals The efficiency of a biomimetic membrane prepared according to the invention is compared with a biomimetic membrane prepared according to a conventional method, which does not use a colloidal suspension, but a nano-crystallization method: 50 µL 100 or 200 mM concentrated methanol solution of HC8 is added to a 10 ml aqueous solution of MPD to obtain a suspension of HC8 nanocrystals (concentration: 0.49 mM or 0.99 mM) for a total volume of 10.05 mL; (MeOH: H2O=0.5:99.5) according to the procedure described in Itsvan Kocsis, Supramolecular artificial water channels: from molecular design to membrane materials, *Thesis to obtain the degree of Doctor of the University of Montpellier in Chemistry and Physicochemistry of Materials*, 6 May 2018 (http://hal.umontpellier.fr/tel-01684404/document).

Table 9 below shows a comparison of the performance (WP=water permeability and salt rejection, %) of the AWC-HC4 and AWC-HC6 membranes according to the invention and of a reference thin-film composite membrane with the AWC-HC8-25 and AWC-HC8-60 membranes repaired according to the method of Itsvan Kocsis document and a reference thin-film composite membrane (TFC for "thin-film composite membrane").

TABLE 9

MEMBRANE PERFORMANCE
Brackish water reverse osmosis

| Membrane | WP/LMH/bar | Observed salt rejection, %. |
|---|---|---|
| AWC-HC4 | 2.09 | 99.25 |
| AWC-HC6 | 3.85-6.6 | 99.51-98.73 |
| TFC (reference) | 1.36 | 98.62 |
| AWC-HC8-25 | 1.15-1.2 | 97.1 |
| AWC-HC8-60 | 1.35 | 95.05 |
| TFC (reference) | 1.17 | 97.06 |

For the membranes obtained by the nano-crystallisation method (not included in the invention), a slight increase in permeability with a decrease in selectivity is observed compared to the TFC reference membrane. These results are related to the creation of micro defects in the polyamide film structure at the interface with the nanocrystals.

On the contrary, the membranes according to the invention AWC-HC4 and AWC-HC6 show clear improvements in permeabilities and with significant selectivities.

FIG. 7 illustrates the difference in structure between the membranes obtained from the nanocrystalline solutions and the membranes obtained from the colloidal solutions. Thus, it can be seen that the membranes according to the invention are homogeneous, with very homogeneous ridge-and-valley protrusions arranged over the entire surface of the membrane. The AWC particles are smaller and interact continuously on the surface of the PA protrusions.

The composite biomimetic membranes according to the invention thus offer the following advantages:

- they are easy to prepare by an inexpensive method of synthesis. They can easily be produced in large quantities without any expensive equipment, and do not require particular safety conditions. Moreover, the strategy of synthesis by supramolecular self-assembly and interfacial polymerization leads to the production of highly organized membrane films with inclusion, within the polyamide PA structure, of active regions from 30 to 40 nm enclosing artificial water channels;
- they have excellent permeability, 4 to 5 times greater (in LPRO-brackish water filtration mode) or 2.8 times greater (in SWRO-seawater filtration mode) than the TFC reference membrane while maintaining selectivity >99.5%—NaCl rejection. They have been tested in the same operating conditions of filtration that are usually employed in the methods used conventionally in desalination. This consequently makes them a material of choice for use as RO membrane in desalination modules;
- they also have remarkable properties of homogeneity due to a controlled nanostructuring during their synthesis. These membranes also display good stability in a basic hydrolytic environment and/or dissolution in the presence of organic solvents such as ethanol or methanol or surfactants such as dodecyl sulphate.

The membranes according to the invention have a biomimetic architecture in the form of the nanometric supramolecular aggregates of the AWC channels with a structure of soft material within a rigid polymer matrix of PA. This particular architecture of the membranes according to the invention is favourable to water permeability without allowing the transport of cations and anions. This offers an advantage in terms of water permeability, thus increasing their capacity for transport while maintaining high ionic retention.

Interesting selectivities obtained for rejection of organic contaminants may also be reported:

- a solution of 2 g/L of urea (pH=7) was filtered with an H-I4RO_3 membrane with a permeability of 4.29 LMH/bar and a rejection of urea of 70%;
- paracetamol solutions of 100 ppm, 200 ppm, 300 ppm were filtered with an H-I4RO_3 membrane with a permeability of 3.76 LMH/bar and rejections of paracetamol of 99.51, 99.14 and 98.98% respectively.

The invention claimed is:

1. A composite biomimetic membrane, comprising:
   an ultrafiltration supporting membrane,
   at least one compound of Formula I:

Formula I in which,
   R represents a linear or branched C4 to C8 alkyl group,
   X represents S or O, and
   a crosslinked polyamide film,
   wherein the at least one compound of Formula I is in a form of supramolecular aggregates of an imidazole-quartet, distributed homogeneously in a rigid matrix formed by the crosslinked polyamide film,
   wherein the supramolecular aggregates are in a form of crystalline aggregates having an average diameter ranging from 20 nm to 40 nm and are made up of self-organized lamellar phases containing artificial water channels of the imidazole-quartet, and
   wherein homogeneous ridge-and-valley protrusions are arranged over the entire surface of the composite biomimetic membrane.

2. The composite biomimetic membrane according to claim 1, wherein the ultrafiltration supporting membrane has a molecular weight cutoff within a range from 10 Kilodaltons (kD) to 250 Kilodaltons (kD).

3. The composite biomimetic membrane according to claim 1, wherein the compound of formula I is selected from the compounds of formula II:

Formula II in which $R^1$ represents butyl or hexyl.

4. The composite biomimetic membrane according to claim 1, wherein the crosslinked polyamide film has a thickness from 0.05 μm to 0.4 μm.

5. The composite biomimetic membrane according to claim 1, wherein the crosslinked polyamide film is a crosslinked polyamide of a di- or triamine monomer and of a di- or tri-acyl chloride monomer, at least one of the monomers being trivalent.

6. The composite biomimetic membrane according to claim 1, wherein R is selected from butyl, pentyl, hexyl, heptyl or octyl functional group.

7. The composite biomimetic membrane according to claim 1, wherein the crosslinked polyamide film has a thickness from 0.05 μm to 0.4 μm.

8. A method of manufacturing the composite biomimetic membrane recited in claim 1, comprising the steps:
   a) impregnating a surface of an ultrafiltration supporting membrane with a colloidal suspension in a form of supramolecular aggregates, thereby forming an impregnated membrane, wherein the colloidal suspension comprises at least one compound of Formula I:

Formula I in which,
R represents a C4 to C8 alkyl functional group selected from butyl, pentyl, hexyl, heptyl or octyl functional group,
X represents S or O; and
   b) forming a crosslinked polyamide film by conducting an interfacial polymerization on a surface of the impregnated membrane obtained in step a), and subsequently producing the composite biomimetic membrane,
wherein the at least one compound of Formula I is in a form of supramolecular aggregates of an imidazole-quartet, distributed homogeneously in a rigid matrix formed by the crosslinked polyamide film,
wherein the supramolecular aggregates are crystalline aggregates having an average diameter from 20 nm to 40 nm and are comprised of self-organized lamellar phases containing artificial water channels of the imidazole-quartet, and
wherein homogeneous ridge-and-valley protrusions are arranged over the entire surface of the composite biomimetic membrane.

9. The method according to claim 8, in which the colloidal suspension comprises an organic solvent and/or water.

10. The method according to claim 8, in which the interfacial polymerization comprises the substeps:
   i) impregnating the surface of the impregnated membrane obtained in step a) with a solution comprising a di- or triamine monomer;
   ii) impregnating the surface of the impregnated membrane obtained in step i) with a solution comprising a di or tri acyl chloride monomer; and
   iii) polymerizing the impregnated membrane obtained in step ii) by immersion in water, at a temperature greater than or equal to 50° C.

11. The method according to claim 8, further comprising a step of rinsing the composite biomimetic membrane.

12. A method for desalinating drinking water, brackish water, or seawater by using the composite biomimetic membrane recited in claim 1, comprising the step of contacting drinking water, brackish water, or seawater with the composite biomimetic membrane.

* * * * *

UNITED STATES PATENT AND TRADEMARK OFFICE
CERTIFICATE OF CORRECTION

| | | |
|---|---|---|
| PATENT NO. | : 12,397,266 B2 | Page 1 of 1 |
| APPLICATION NO. | : 17/642625 | |
| DATED | : August 26, 2025 | |
| INVENTOR(S) | : Mihail-Dumitru Barboiu et al. | |

It is certified that error appears in the above-identified patent and that said Letters Patent is hereby corrected as shown below:

In the Claims

Column 19, Claim 7, Line 27, cancel the text beginning with "The composite biomimetic membrane" to and ending with "thickness from 0.05 μm to 0.4 μm" in Line 29, and insert the following claim:

--The composite biomimetic membrane according to claim 1, wherein the crosslinked polyamide film has a thickness from 0.08 μm to 0.15 μm.--

Signed and Sealed this
Third Day of February, 2026

John A. Squires
*Director of the United States Patent and Trademark Office*